(12) United States Patent
Schloegel

(10) Patent No.: US 7,464,953 B2
(45) Date of Patent: Dec. 16, 2008

(54) FREESTYLE PEGS FOR MOTORCYCLES

(76) Inventor: Douglas Schloegel, P.O. Box 44, Gaines, PA (US) 16921

( * ) Notice: Subject to any disclaimer, the term of this patent is extended or adjusted under 35 U.S.C. 154(b) by 30 days.

(21) Appl. No.: 11/649,782

(22) Filed: Jan. 5, 2007

(65) Prior Publication Data

US 2007/0108726 A1    May 17, 2007

Related U.S. Application Data

(63) Continuation-in-part of application No. 10/986,204, filed on Nov. 12, 2004, now Pat. No. 7,159,886.

(60) Provisional application No. 60/527,008, filed on Dec. 5, 2003.

(51) Int. Cl.
*B62J 25/00* (2006.01)
*B62H 1/00* (2006.01)
*G05G 1/18* (2006.01)

(52) U.S. Cl. .................. 280/291; 280/288.4; 74/564

(58) Field of Classification Search .............. 280/288.4, 280/291; 74/564
See application file for complete search history.

(56) References Cited

U.S. PATENT DOCUMENTS

| | | |
|---|---|---|
| 4,638,682 A | 1/1987 | Michiyama |
| 4,771,651 A | 9/1988 | Haro |
| 5,454,580 A | 10/1995 | Lin |
| 5,638,723 A | 6/1997 | Lin |
| 5,826,900 A | 10/1998 | Steele |
| 5,884,983 A | 3/1999 | Wu |
| 5,997,023 A | 12/1999 | Sauter |
| 6,070,897 A | 6/2000 | Hsieh et al. |
| 6,129,370 A | 10/2000 | Hsieh et al. |
| 6,142,499 A | 11/2000 | Hsieh et al. |
| 6,149,177 A | 11/2000 | Valdez |
| 6,193,255 B1 | 2/2001 | Lo |
| 6,199,887 B1 | 3/2001 | Lee |
| 6,247,761 B1 | 6/2001 | Lin |
| 6,485,044 B1 | 11/2002 | Blake |
| 6,499,378 B1 | 12/2002 | Ho |
| 6,783,143 B1 | 8/2004 | Hung |
| 2003/0095414 A1 | 5/2003 | Tracey |
| 2003/0132592 A1 | 7/2003 | Domroski |
| 2004/0222613 A1 | 11/2004 | Cramer |

*Primary Examiner*—Joanne Silbermann
*Assistant Examiner*—Marc A Scharich
(74) *Attorney, Agent, or Firm*—Richard C. Litman

(57) ABSTRACT

Freestyle pegs for a motorcycle. The pegs permit the motorcycle rider to perform stunts in the same way stunts are performed on a bicycle. Each peg includes two axially aligned, interconnected cylindrical members. The members are coaxial with the axle of the motorcycle and extend outwardly therefrom. As contemplated, the pegs will be disposed on both front and rear axles. Two broad groups of embodiments are disclosed herein. One group has one of the pegs, i.e. a single peg element of the assembly, formed integrally with the interconnecting rod or shaft and the other peg element removably attached to the other end of the shaft. Another group provides an interconnecting shaft with each peg element being removably secured to an end of the shaft.

16 Claims, 13 Drawing Sheets

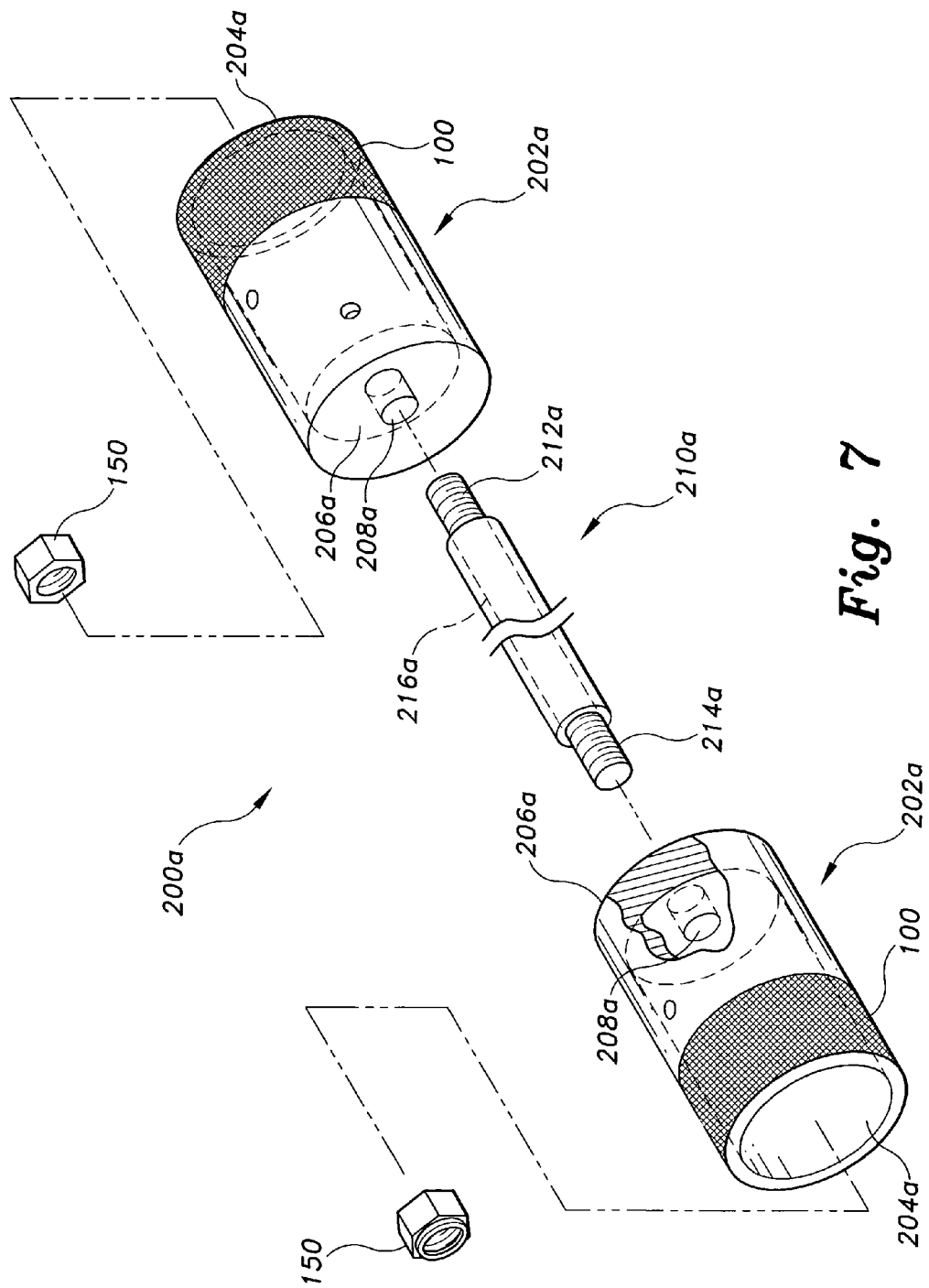

FREESTYLE PEGS FOR MOTORCYCLES

CROSS-REFERENCE TO RELATED APPLICATION

This application is a continuation in part of U.S. Utility patent application Ser. No. 10/986,204 filed on Nov. 12, 2004, now U.S. Pat. No. 7,159,886, which application claims the benefit of U.S. Provisional Patent Application Ser. No. 60/527,008, filed Dec. 5, 2003.

BACKGROUND OF THE INVENTION

1. Field of the Invention

The present invention relates to wheel axle pegs, and particularly to a motorcycle axle peg that enables a rider to perform particular stunts while operating the motorcycle.

2. Description of the Related Art

Freestyle bike riding and stunt performance have long been sources of thrills and entertainment. From wheelies to endos, bike stunts require a great deal of skill, and in some cases, special equipment. One piece of equipment sometimes used for bicycle stunts is an axle peg. Pegs extend out from the axle or forks of the front and rear bike wheels and allow a rider to perform stunts such as sliding down a handrail or standing on the pegs while riding the bike. A similar device adapted for use with motorcycles would enable a motorcycle rider to perform these stunts and many more.

The related art (as indicated in the accompanying IDS) discloses many foot pegs mounted on motorcycle frames. These pegs are positioned so that the rider can rest his feet when desired. Such positioning would militate against stunt performance. Note that the related art shows foot pegs closely adjacent the wheel axle on bicycles used in stunt riding.

None of the above inventions and patents, taken either singly or in combination, is seen to disclose freestyle pegs for motorcycles as will subsequently be described and claimed in the instant invention.

SUMMARY OF THE INVENTION

The instant invention is drawn to freestyle pegs for a motorcycle. The pegs permit the motorcycle rider to perform stunts in the same way stunts are performed on a bicycle. Each peg includes two axially aligned, interconnected, cylindrical members. The members are coaxial with the axle of the motorcycle and extend outwardly therefrom. As contemplated, the pegs will be disposed on both front and rear axles.

Accordingly, the invention provides freestyle pegs for motorcycles that enable a rider to perform various stunts while operating the motorcycle. The peg structure is strong, durable and warp-resistant. The pegs are easy to attach to the motorcycle wheels and the peg structure functions as a wheel axle. Some embodiments include one cylindrical member (or single peg element of the assembly) and connecting rod (or axle shaft of the assembly) manufactured as an inseparable, monolithic unit with only one separable member from one end of the rod, while other embodiments include two peg elements (cylindrical members) separately attachable to each end of the connecting rod or axle shaft.

The invention provides improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

FIG. 7 is an exploded perspective view of a fourth embodiment peg and connecting shaft assembly, wherein both pegs are separable from the shaft.

Similar reference characters denote corresponding features consistently throughout the attached drawings.

DETAILED DESCRIPTION OF THE PREFERRED EMBODIMENTS

Figure 1:
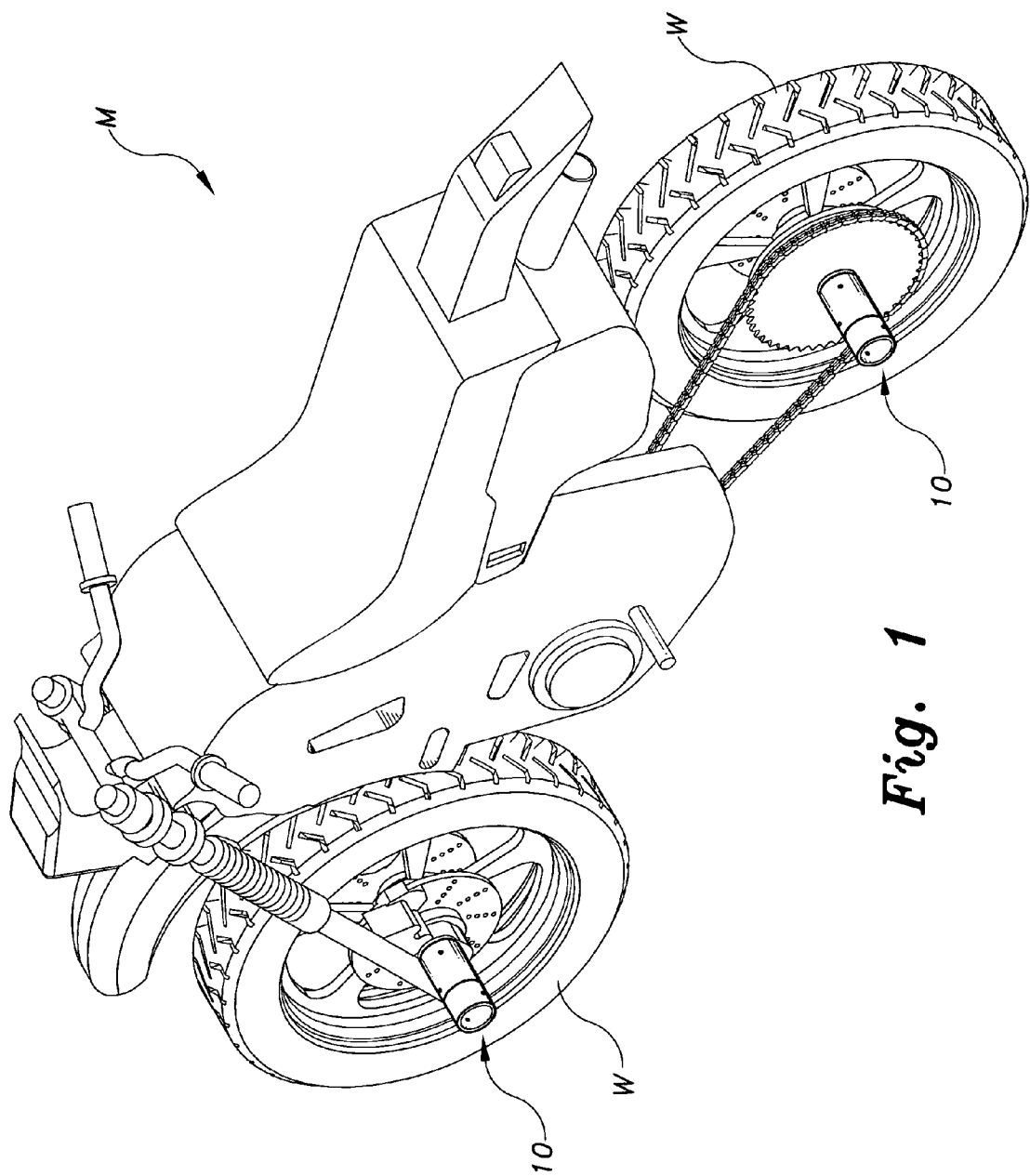
FIG. 1 is an environmental, perspective view of a motorcycle equipped with the freestyle pegs for motorcycles according to the present invention.

The present invention is directed to freestyle pegs for motorcycles, designated generally as 10 in the drawings. The freestyle pegs 10 are shown mounted to a motorcycle M having front and rear wheels W in FIGS. 1 and 2. The freestyle pegs 10 are designed to enable a motorcycle rider to perform stunts, such as standing on the pegs, or hooking the pegs onto the side of a half-pipe.

Figure 3:
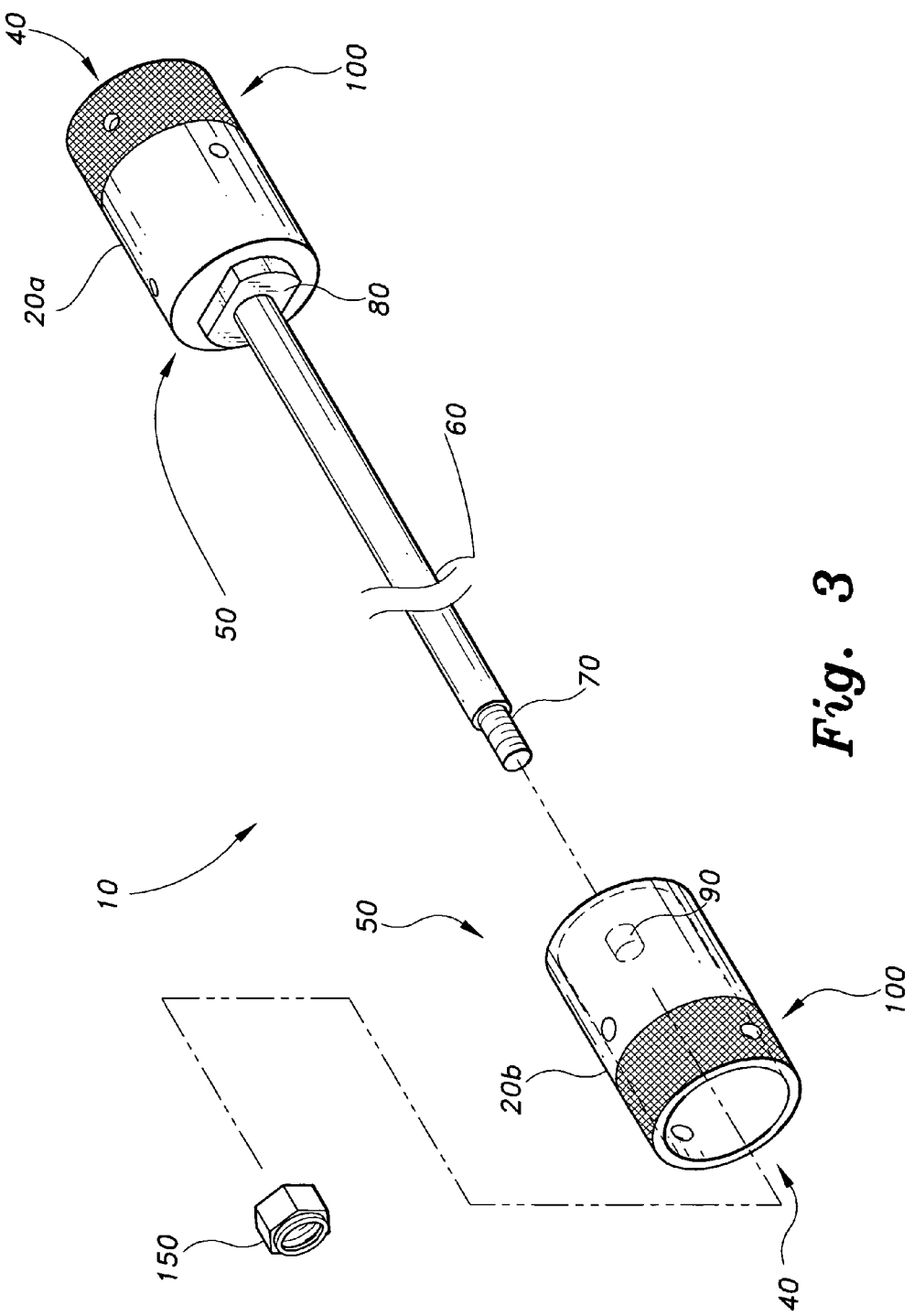
FIG. 3 is an exploded view of a first embodiment of the freestyle pegs for motorcycles according to the present invention.

Referring to FIG. 3, the freestyle pegs 10, include first and second cylindrical members 20a and 20b. Each respective member has an open end 40 and a closed end 50. A connecting rod 60, having a threaded distal end 70, extends from the closed end 50 of the first cylindrical member 20a. The proximate end of connecting rod 60 extends through a peg lock 80 and is attached to the closed end of first cylindrical member 20a. The closed end of second cylindrical member 20b is provided with a bore 90, which bore receives the distal threaded end 70 therethrough. A lock nut 150 is tightened onto the threaded end 70 to secure the connecting rod 60 to the second cylindrical member 20b. Each cylindrical member 20a, 20b is provided with a knurled predetermined outer surface area 100 to provide traction for a rider's shoes. Other options include parallel grooves along the circumferential planes of the cylindrical members or a combination of knurls and grooves. If desired, circular holes may be provided in the cylindrical members for aesthetic enhancement and/or for weight savings. The cylindrical members 20a, 20b and connecting rod 60 are preferably made of stainless steel or other high-strength, resilient metal that is capable of supporting the rider and motorcycle. Connecting rod 60 can be hollow, semi-hollow or solid as long as it is of the required necessary strength.

Figure 2:
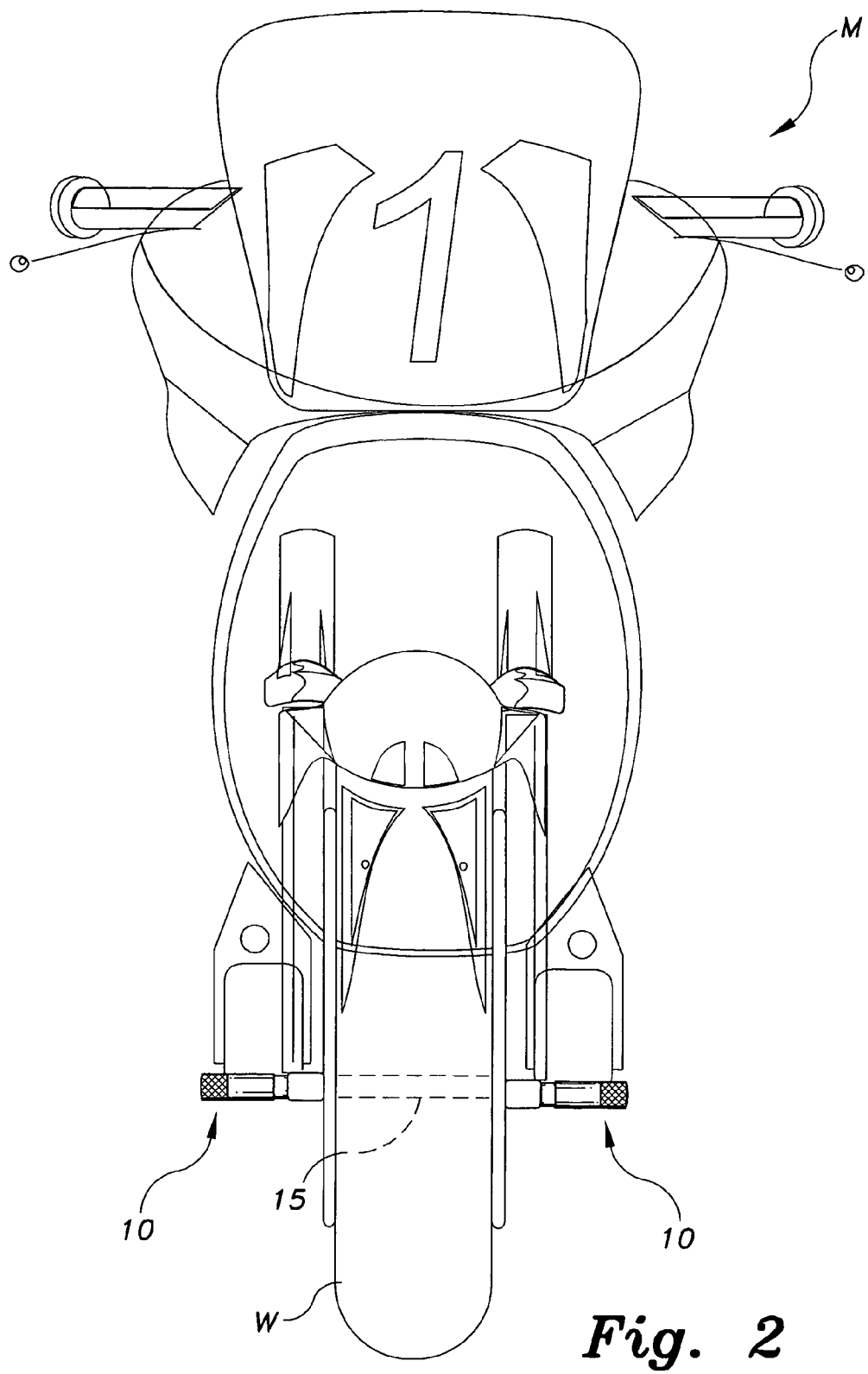
FIG. 2 is a front, environmental view of the freestyle pegs for motorcycles according to the present invention.

In use, the freestyle motorcycle pegs 10 are attached to the motorcycle by removing the wheel axle and inserting the connecting rod 60 through the passage 15 formerly occupied by the axle, shown in broken lines in FIG. 2. Once the second cylindrical member (20b) is attached to the connecting rod, it is tightened into position against the side of the wheel, creating a tight fit between the cylindrical members and the wheel sides. The cylindrical members extend outwardly from the wheel and are disposed on opposite sides of the wheel (FIG. 2), allowing the rider to perform various stunts, such as standing on the pegs while riding the motorcycle, or hooking the pegs onto the edge of a half-pipe.

Figure 4:
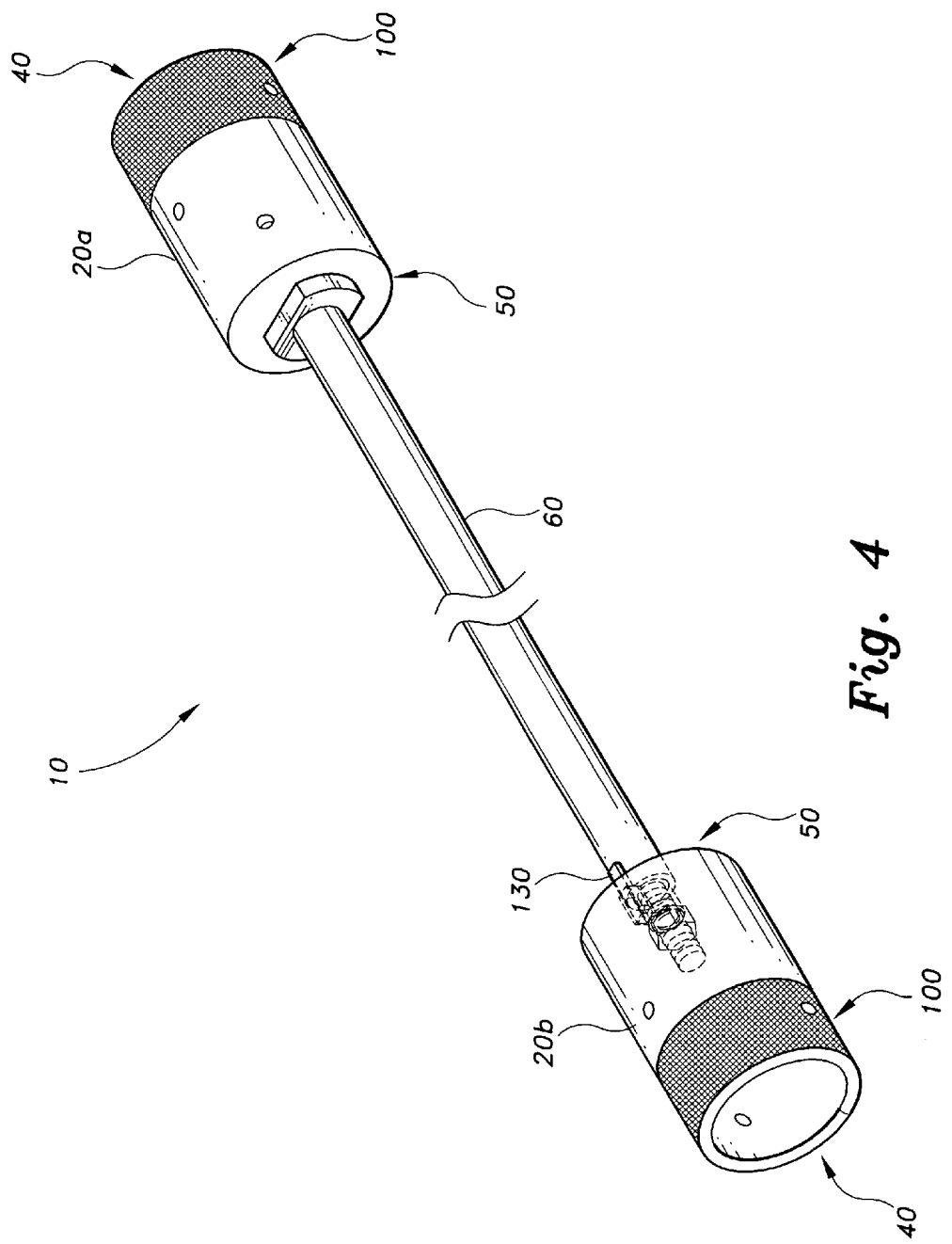
FIG. 4 is a perspective view of a second embodiment of the freestyle pegs for motorcycles according to the present invention.
Figure 5:
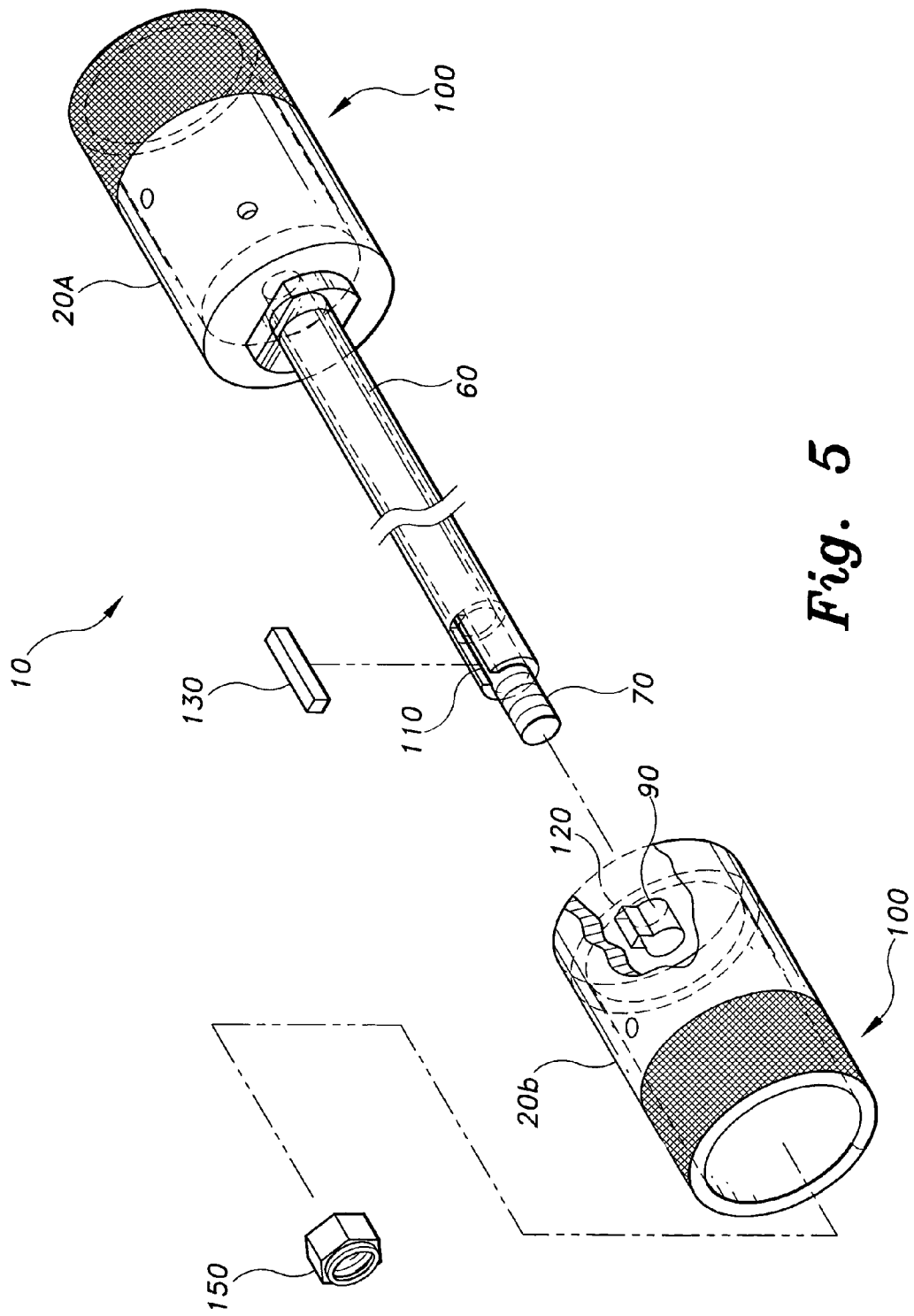
FIG. 5 is an exploded, perspective view of the freestyle pegs for motorcycles of FIG. 4.

In the embodiment shown in FIGS. 4 and 5, the connecting rod 60 has a keyway slot 110 disposed above and behind the threaded end 70. The threaded end 70 is inserted into the bore 90 in the second cylindrical member 20b in such a way that the keyway slot 110 aligns with a second keyway slot 120 disposed above the smooth bore 90. A rectangular key 130 is inserted into the keyway slots. The size of the key is such that a portion of it extends into both keyway slots 110 and 120, thereby preventing rotational movement between the second cylindrical member 20b and the connecting rod 60. The closed end 50a of first cylindrical member 20a is recessed.

Figure 6A:
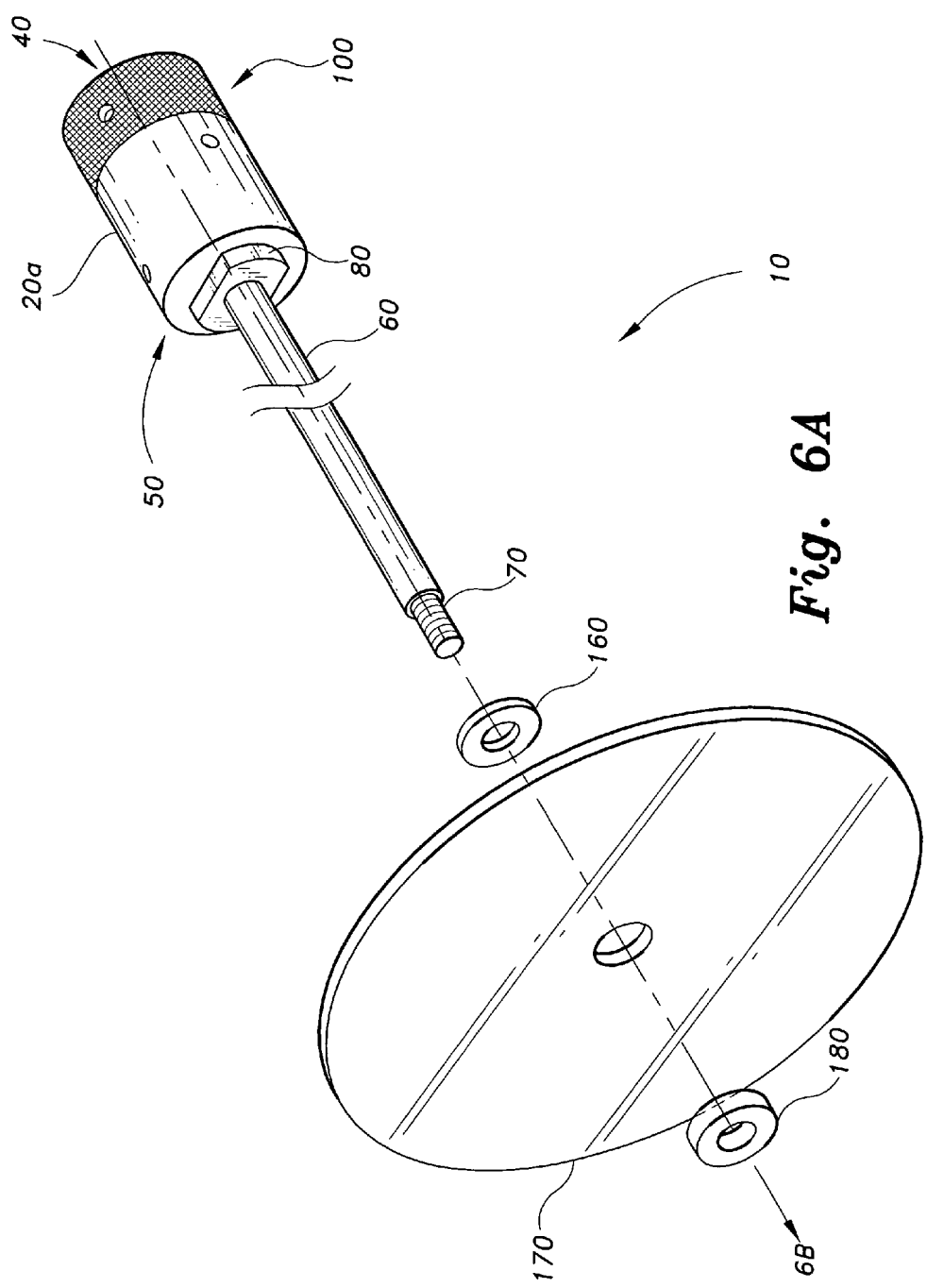
FIGS. 6A and 6B are exploded, perspective views of a third embodiment of the freestyle pegs for motorcycles according to the present invention.
Figure 6B:
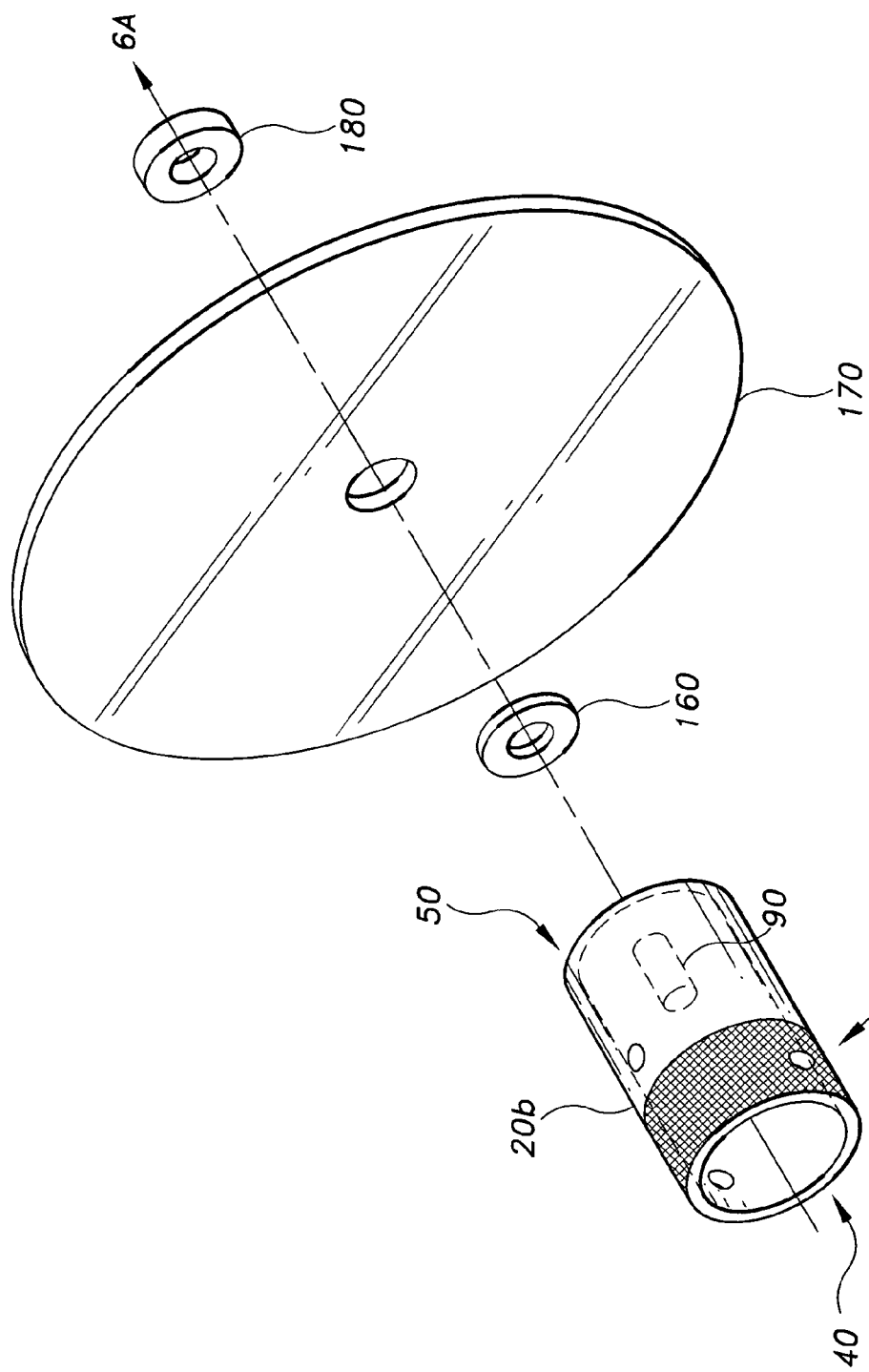

A third embodiment, shown exploded in FIGS. 6A and 6B, employs respective washers 160, disk guards 170 and spacers 180. The aforementioned elements function to enhance stability of the structure. When assembled, each cylindrical member will have a respective washer 160, disk guard 170 and spacer 180 adjacent thereto.

The freestyle peg embodiments of FIGS. 3 through 6b all preferably comprise only two major components, i.e. the second cylindrical member (or second peg) 20b, and the monolithically formed, unitary combination of the connecting rod (or interconnecting shaft) 60 and its first cylindrical member (or first peg) 20a extending therefrom. However, it will be seen that the two pegs (or cylindrical members) may be formed identically to one another for removable attachment to a laterally symmetrical interconnecting shaft (or connecting rod), if so desired. FIGS. 7 through 12 provide illustrations of a series of embodiments wherein the two peg components are separable from the axle or interconnecting shaft.

FIG. 7 illustrates a fourth embodiment of the freestyle peg assembly, designated as peg assembly 200a. The peg assembly 200a of FIG. 7 includes essentially identical and substantially hollow first and second peg components 202a, which removably attach to the two opposite ends of a laterally symmetrical interconnecting axle shaft. Each of the separate pegs or peg components 202a includes an open end 204a and an opposite generally closed end 206a having a flat outer surface. The end 206a of each peg is not completely closed, in that it includes a concentric passage 208a formed therethrough for the attachment of the interconnecting axle or shaft. The interconnecting shaft passages 208a of the peg components 202a of FIG. 7 are smoothly surfaced, and are devoid of attachment means (threads, etc.). This allows the peg components 202a to slip axially onto the ends of the interconnecting axle or shaft without requiring rotation, as in threading one threaded object onto another cooperatingly threaded object. A portion or all of the outer surfaces of the peg components 202a may include knurling or other high friction finish 100 as desired, as indicated in the first three embodiments illustrated in FIGS. 2 through 6B.

The interconnecting axle or shaft 210a is laterally symmetrical, with opposite threaded first and second ends 212a and 214a. The axle shaft 210a may comprise a solid rod with threads machined on each end thereof, or may comprise a tube having a hollow central volume 216a, with the threaded end components 212a and 214a comprising relatively short studs affixed (welded, etc.) into the ends of the tubular shaft 210a.

The interconnecting shaft passages 208a of the peg components 202a are of slightly larger diameter than the major diameter of the threaded ends 212a, 214a of the interconnecting axle shaft 210a, but of smaller diameter than that of the shaft 210a proper between the threaded end portions thereof. This provides a seat for the closed ends 206a of each peg component 202a at the base of the threads on each end of the interconnecting shaft 210a.

The assembly is installed upon a motorcycle, e.g. the motorcycle M of FIGS. 1 and 2, by first installing a single one of the peg components 202a onto one of the ends of the interconnecting shaft 210a and securing the peg component in place with a locknut 150 or the like, as used in the assembly of the first three embodiments of FIGS. 3 through 6B. The conventional front or rear wheel axle (or both, if two such assemblies 200a are to be installed) is then removed from the motorcycle M, and the partially assembled peg assembly comprising a single peg component 202a and interconnecting axle 210a is inserted through the axle passage 15 (shown in FIG. 2). The second peg component 202a is then installed upon the exposed threads of the interconnecting shaft 210a, and secured in place by another locknut 150.

Figure 8:
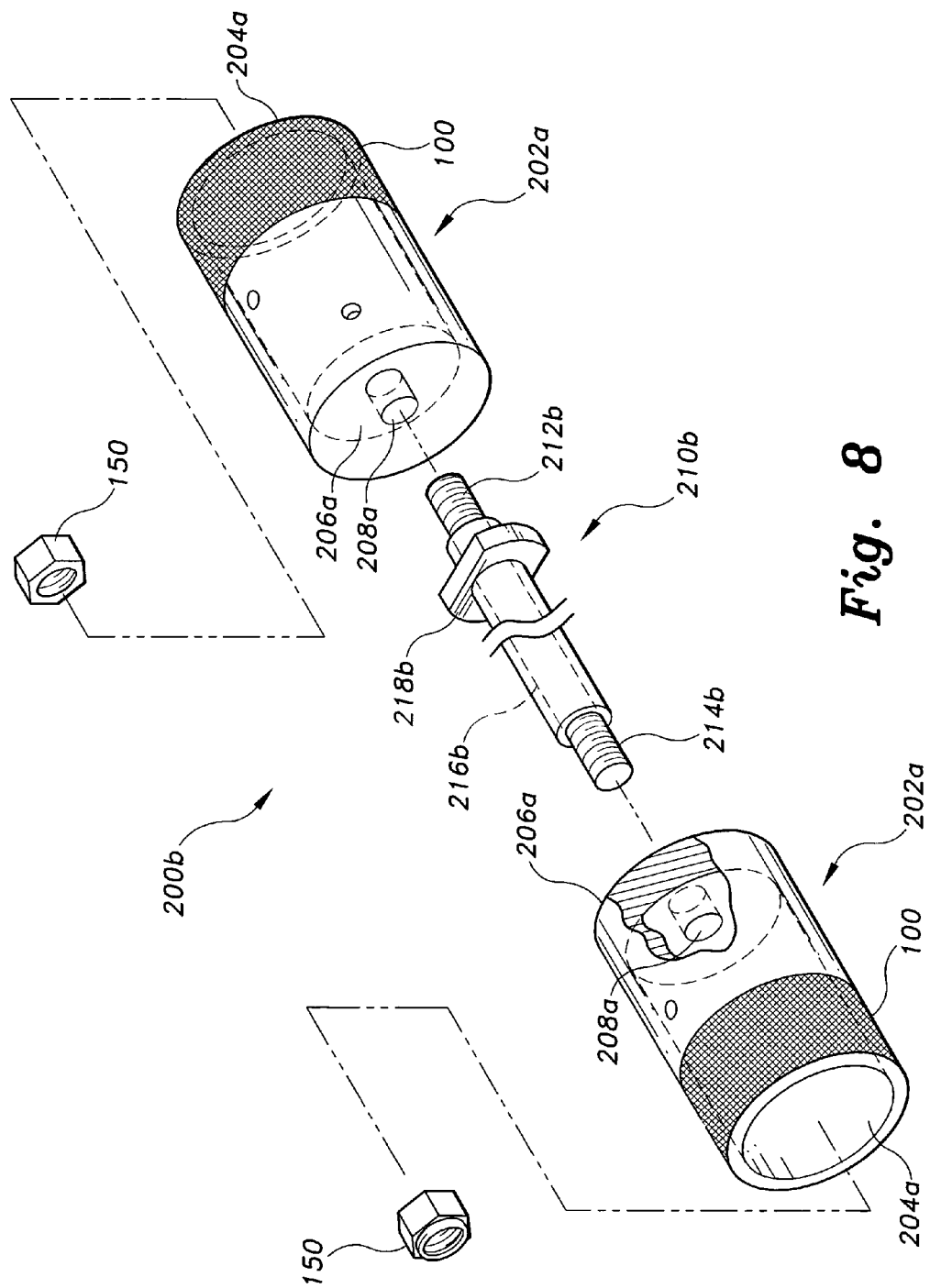
FIG. 8 is an exploded perspective view of a peg and connecting shaft assembly similar to that of FIG. 7, but incorporating a rotational stop on the shaft.

It will be noted that the embodiment 200a of FIG. 7 does not include any radially disposed protuberance on the axle shaft 210a or upon the closed faces 206a of the two peg components 202a. Thus, the installed assembly may be prone to rotation within the axle passage 15 of the motorcycle, unless some means is provided to prevent such rotation. Accordingly, the fifth embodiment 200b illustrated in FIG. 8 includes such rotation prevention means. The two peg components 202a of the embodiment of FIG. 8 are identical to the pegs 202a of the embodiment of FIG. 7, as the two opposed ends 212b and 214b of the interconnecting axle shaft 210b of FIG. 8 are configured the same as the corresponding ends 212a and 214a of the shaft 210a of FIG. 7. The only difference between the two embodiments of FIGS. 7 and 8 is that the interconnecting shaft 210b of FIG. 8 includes a shaft rotation lock 218b, i.e. a non-circular flange or the like, extending radially from the shaft adjacent the first threaded end 212b thereof. This rotation lock 218b seats within a correspondingly shaped receptacle in the wheel axle support structure of the motorcycle M, to prevent rotation of the shaft 210b relative to the structure of the motorcycle M.

Figure 9:
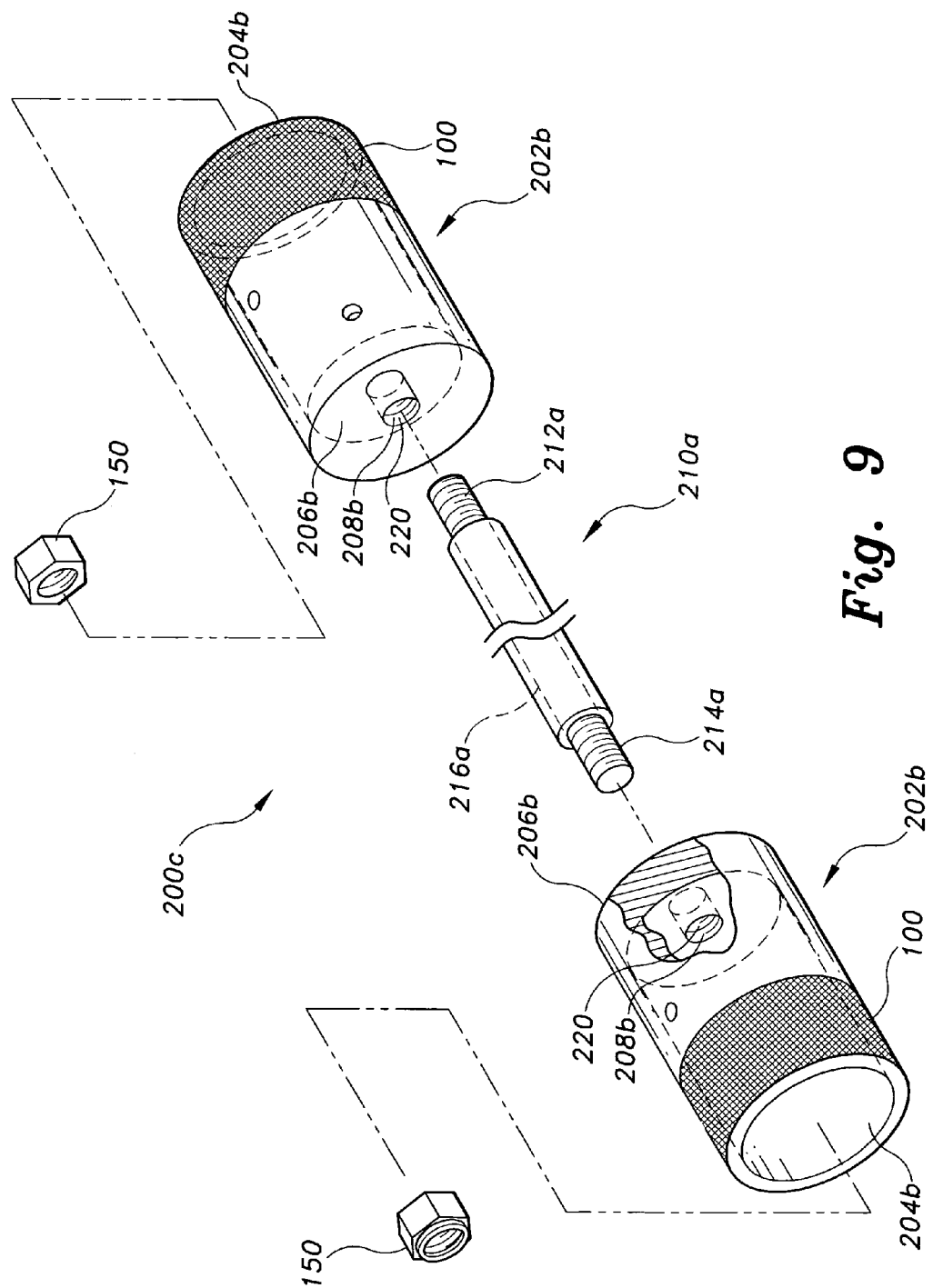
FIG. 9 is an exploded perspective view of a peg and connecting shaft assembly similar to that of FIG. 7, with the attachment holes in the pegs being threaded for attachment to the shaft.

The sixth embodiment 200c of FIG. 9 is similar to the fourth embodiment 200a of FIG. 7, in that the interconnecting axle shaft 210a of FIG. 9 is identical to the shaft 210a of FIG. 7. The two peg components 202b are identical to one another in FIG. 9, having opposed open and closed ends 204b and 206b with the closed end including a shaft attachment passage 208b formed concentrically therethrough. The only difference between the peg components 202b of FIG. 9 and the peg components 202a of FIGS. 7 and 8, is that the shaft attachment passages 208b of the peg components 202b of FIG. 9 are internally threaded with cooperating threads 220 which mate with the externally threaded ends 212a and 214a of the interconnecting shaft 210a. Thus, the peg components 202b must be threaded onto the ends of the shaft 210a for attachment thereto, with mating lock nuts 150 then being installed to lock the assembly together.

Figure 10:
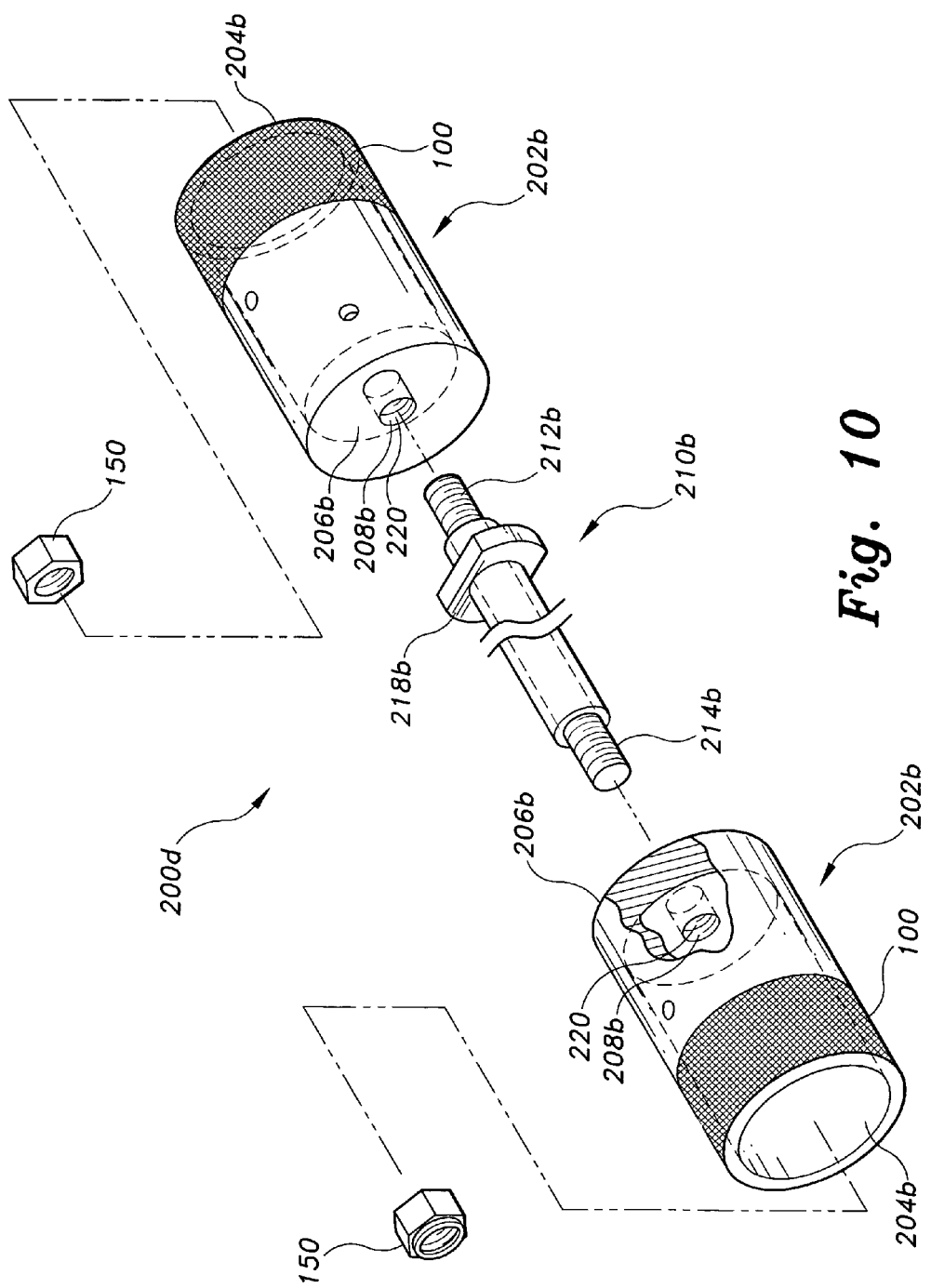
FIG. 10 is an exploded perspective view of a peg and connecting shaft assembly similar to that of FIG. 9, but incorporating a rotational stop on the shaft.

The seventh embodiment 200d of FIG. 10 essentially comprises a combination of the two peg components 202b with their internally threaded shaft installation passages 208b of the embodiment of FIG. 9, and the interconnecting shaft or axle 210b with its rotation lock 218b of the embodiment of FIG. 8. Thus, the two peg components 202b thread onto the corresponding threaded ends 212b and 214b of the shaft 210b and are rotationally locked in place by locknuts 150, with the interconnecting axle shaft 210b being rotationally locked to the wheel support structure of the motorcycle M by the shaft rotation lock 218b adjacent the first end 212b of the interconnecting shaft.

Figure 11:
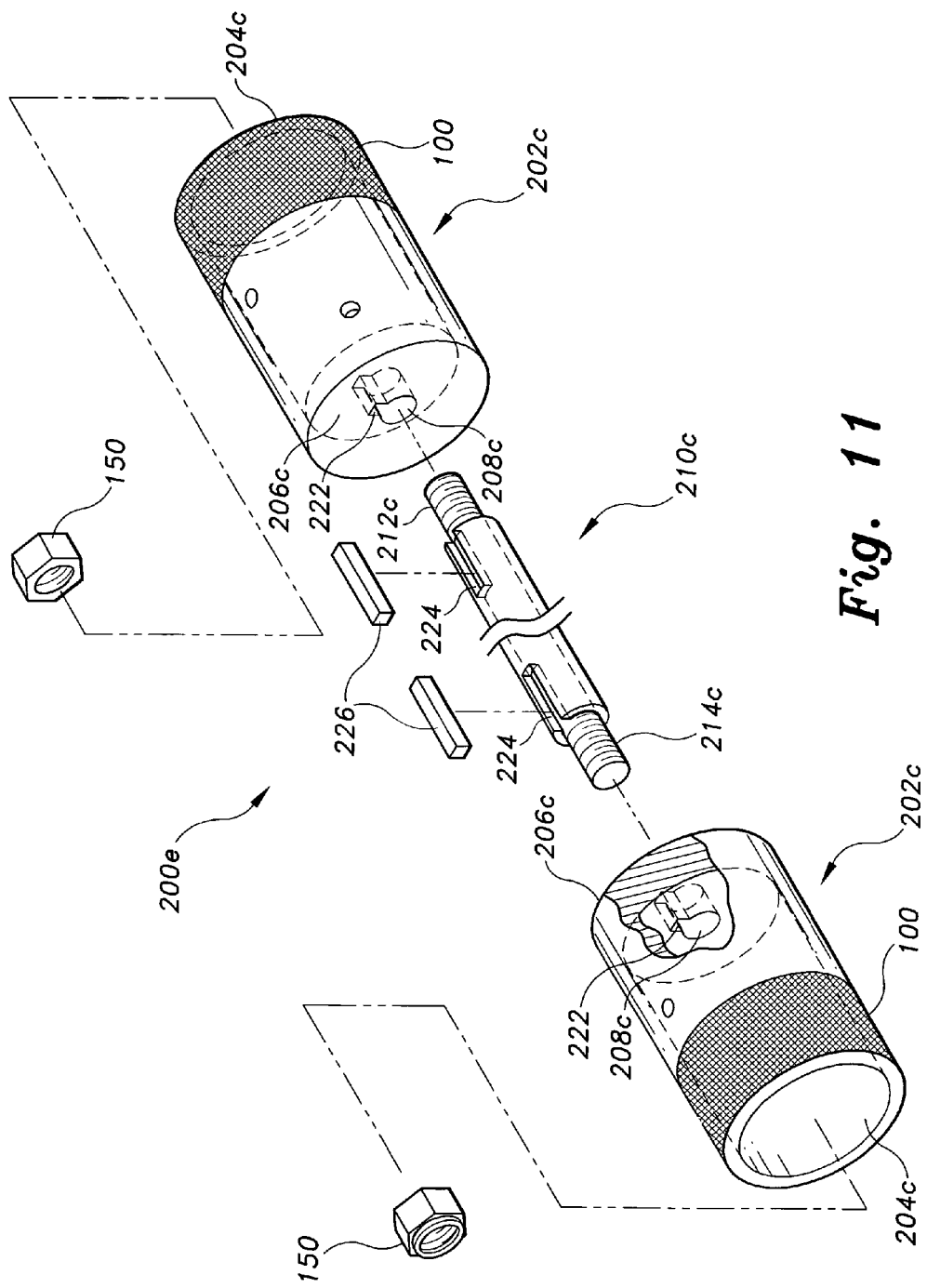
FIG. 11 is an exploded perspective view of a peg and connecting shaft assembly similar to that of FIG. 7, but incorporating key slots in the pegs and in the ends of the shaft with keys for preventing relative rotation between pegs and shaft.

The eighth embodiment 200e of FIG. 11 illustrates another means for locking the two peg components rotationally relative to the interconnecting shaft or axle. The two peg components 202c of FIG. 11 are configured essentially like the peg components 202a of the embodiments of FIGS. 7 and 8, I.e. having opposite open and closed ends 204c and 206c with an interconnecting axle shaft passage 208c extending through the closed end of the peg. However, the shaft passage 208c differs from the smooth bore passage 208a of the peg embodiment 202a of FIGS. 7 and 8, by having a peg keyway slot 222 cut in the side of the interconnecting shaft attachment passage. The interconnecting shaft 210c of FIG. 11 differs correspondingly from the shaft 210a of FIGS. 7 and 9, by having first and second shaft keyway slots 224 cut in the side of the interconnecting shaft, adjacent the first and second threaded ends 212c and 214c thereof. The peg assembly 200c is assembled by placing a key 226 in one of the shaft keyway slots 224, and sliding one of the peg components 202c over the end of the shaft having the key installed therein, with the key 226 holding the peg component 202c and shaft 210c in rotational registry with one another. The peg component 202c is secured to the shaft 210c by a locknut 150, as in other embodiments. This subassembly is installed through the axle passage 15 of the front or rear wheel W of the motorcycle M, as shown in FIG. 2, and the opposite peg component 202c is secured to the remaining free end of the interconnecting axle shaft as described above for the attachment of the first peg component.

Figure 12:
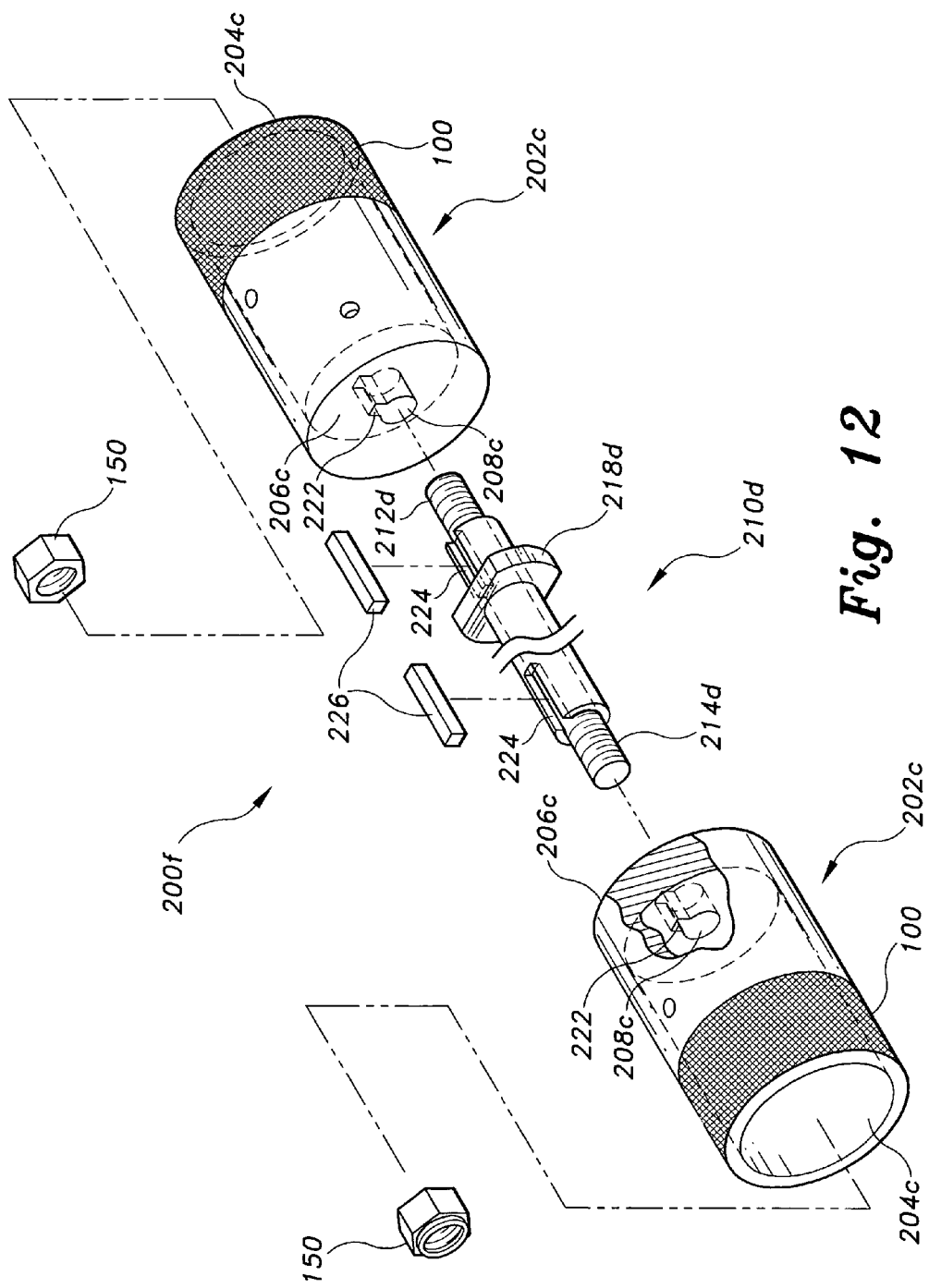
FIG. 12 is an exploded perspective view of a peg and connecting shaft assembly similar to that of FIG. 11, but incorporating a rotational stop on the shaft.

Finally, a ninth embodiment 200f is illustrated in FIG. 12 of the drawings. This ninth embodiment peg assembly 200f is similar to the eighth embodiment 200e of FIG. 11, in that the peg components 202c are identical to those components 202c of FIG. 11 and incorporate peg keyway slots 222 in their shaft passages 208c. However, the interconnecting shaft 210d of FIG. 12 differs from the shaft 210c of FIG. 11, in that the shaft 210d includes a shaft rotation lock 218d (similar to the shaft rotation lock 218b of the shaft embodiment 210b of FIGS. 8 and 10) disposed adjacent to its threaded first end 212d. This embodiment provides positive rotational locking of the two peg components 202c relative to the interconnecting shaft 210d, and also provides for the rotational locking of the shaft 210d relative to the motorcycle structure due to the shaft rotation lock 218d.

In conclusion, the present freestyle pegs for motorcycles in their various embodiments enable a motorcyclist to shift his or her weight on the cycle to a considerably greater degree than was previously the case, when the pegs are installed at the front and/or rear wheel axle locations. As an example, the present pegs when installed through the rear wheel hub enable the rider to more easily and effectively shift his or her weight rearwardly, and/or gain a greater rearward weight shift, when standing on those pegs, thus facilitating "wheelie" maneuvers. Some embodiments of the present freestyle pegs may be assembled so as to permit rotation of the pegs relative to the interconnecting shaft, and/or permit rotation of the shaft relative to the motorcycle structure, if so desired. Other embodiments enable the rider to lock the rotation of the pegs relative to the motorcycle structure, thereby providing more secure footing when installed. Accordingly, the present freestyle pegs will find great favor among accomplished and experienced trick riders, enabling those riders to expand their repertoire of tricks, stunts, and maneuvers.

It is to be understood that the present invention is not limited to the embodiments described above, but encompasses any and all embodiments within the scope of the following claims.

I claim:

1. A freestyle peg assembly for a motorcycle, comprising:
a first peg and a second peg each having an open end and a flat, generally closed end opposite the open end, the closed end further including an interconnecting shaft attachment passage formed concentrically therethrough;
an interconnecting shaft having a threaded first end and a threaded second end opposite the first end, the first peg and second peg removably attached to the corresponding end of the interconnecting shaft;
a first and a second locking fastener removably attached to the corresponding end of the interconnecting shaft, respectively capturing and securing the first peg and the second peg to the interconnecting shaft;
a peg keyway slot disposed in the interconnecting shaft attachment passage of each peg;
a shaft keyway slot disposed adjacent each threaded end of the interconnecting shaft; and
a key selectively disposed within each peg keyway slot and corresponding shaft keyway slot, precluding relative rotation between each peg and the interconnecting shaft.

2. The freestyle peg assembly for a motorcycle according to claim 1, further including a shaft rotation lock disposed adjacent the first threaded end of the interconnecting shaft.

3. The freestyle peg assembly for a motorcycle according to claim 1, further including a motorcycle in combination therewith, the motorcycle further having a front wheel and a rear wheel, each wheel further having an axle passage disposed therethrough, the interconnecting shaft removably disposed through the axle passage of at least one wheel of the motorcycle, the first peg and second peg removably attached to the respective first end and second end of the interconnecting shaft.

4. The freestyle peg assembly for a motorcycle according to claim 3, wherein the interconnecting shaft attachment passage of each peg is smoothly surfaced and devoid of attachment threads thereon.

5. The freestyle peg assembly for a motorcycle according to claim 1, wherein the interconnecting shaft attachment passage of each peg further includes internal threads cooperating with the corresponding threaded end of the interconnecting shaft.

6. The freestyle peg assembly for a motorcycle according to claim 1, wherein the interconnecting shaft comprises a tube having a hollow center enclosed by the first threaded end and the second threaded end.

7. A freestyle peg assembly for a motorcycle, comprising:
a first peg and a second peg, each having an open end and a flat, generally closed end opposite the open end;

the closed end of at least one peg further including an interconnecting shaft attachment passage formed concentrically therethrough;

an interconnecting shaft having a first end and a second end opposite the first end;

at least one end of the interconnecting shaft further including threads disposed thereon, the at least one peg having the interconnecting shaft attachment passage formed through the closed end thereof being removably attached to the corresponding threaded end of the interconnecting shaft;

at least one locking fastener removably attached to the corresponding threaded end of the interconnecting shaft, respectively capturing and securing the at least one peg to the interconnecting shaft;

at least one peg keyway slot disposed in the interconnecting shaft attachment passage of the at least one peg;

at least one shaft keyway slot disposed adjacent the corresponding threaded end of the interconnecting shaft; and at least one key selectively disposed within the at least one peg keyway slot and corresponding shaft keyway slot, precluding relative rotation between the at least one peg and the interconnecting shaft.

8. The freestyle peg assembly for a motorcycle according to claim 7, wherein:

the first peg is permanently attached to the first end of the interconnecting shaft as a monolithic unit therewith;

the closed end of the second peg further includes the interconnecting shaft attachment passage formed therethrough;

the threads of the interconnecting shaft are disposed upon the second end thereof; and a single locking fastener is removably attached to the threaded second end of the interconnecting shaft, respectively capturing and securing the second peg to the interconnecting shaft.

9. The freestyle peg assembly for a motorcycle according to claim 7, wherein:

the closed end of each peg further includes an interconnecting shaft attachment passage formed therethrough;

each end of the interconnecting shaft includes threads disposed thereon; and a locking fastener is removably attached to each threaded end of the interconnecting shaft, respectively capturing and securing the corresponding peg to the interconnecting shaft.

10. The freestyle peg assembly for a motorcycle according to claim 7, wherein the interconnecting shaft attachment passage of the at least one peg is smoothly surfaced and devoid of attachment threads thereon.

11. The freestyle peg assembly for a motorcycle according to claim 7, wherein the interconnecting shaft attachment passage of the at least one peg further includes internal threads cooperating with the corresponding threaded end of the interconnecting shaft.

12. The freestyle peg assembly for a motorcycle according to claim 7, wherein the interconnecting shaft comprises a tube having a hollow center enclosed by the first end and the second end.

13. A freestyle peg assembly for a motorcycle and a motorcycle, comprising in combination:

a first peg and a second peg each having an open end and a generally closed end opposite the open end, the closed end further including an interconnecting shaft attachment passage formed concentrically therethrough;

an interconnecting shaft having a threaded first end and a threaded second end opposite the first end, the first peg and second peg removably attached to the corresponding end of the interconnecting shaft;

a first and a second locking fastener removably attached to the corresponding end of the interconnecting shaft, respectively capturing and securing the first peg and the second peg to the interconnecting shaft;

a peg keyway slot disposed in the interconnecting shaft attachment passage of each peg;

a shaft keyway slot disposed adjacent each threaded end of the interconnecting shaft;

a key selectively disposed within each peg keyway slot and corresponding shaft keyway slot, precluding relative rotation between each peg and the interconnecting shaft; and a motorcycle front wheel and a motorcycle rear wheel, each wheel further having an axle passage disposed therethrough, the interconnecting shaft removably disposed through the axle passage of at least one wheel of the motorcycle, the first peg and second peg removably attached to the respective first end and second end of the interconnecting shaft.

14. The freestyle peg assembly for a motorcycle and motorcycle combination according to claim 13, further including a shaft rotation lock disposed adjacent the first threaded end of the interconnecting shaft.

15. The freestyle peg assembly for a motorcycle and motorcycle combination according to claim 13, wherein the interconnecting shaft attachment passage of each peg is smoothly surfaced and devoid of attachment threads thereon.

16. The freestyle peg assembly for a motorcycle and motorcycle combination according to claim 13, wherein the interconnecting shaft attachment passage of each peg further includes internal threads cooperating with the corresponding threaded end of the interconnecting shaft.

* * * * *